Dec. 2, 1969 P. J. REISING 3,481,172

WIRE-BENDING MACHINE

Filed June 14, 1967

INVENTOR.
Paul J. Reising
BY
Barnard, McGlynn & Reising
ATTORNEYS

United States Patent Office

3,481,172
Patented Dec. 2, 1969

3,481,172
WIRE-BENDING MACHINE
Paul J. Reising, Birmingham, Mich., assignor to Lear Siegler, Inc., Santa Monica, Calif., a corporation of Delaware
Filed June 14, 1967, Ser. No. 645,923
Int. Cl. B21f 3/027, 3/04
U.S. Cl. 72—140    15 Claims

ABSTRACT OF THE DISCLOSURE

A method and apparatus for manufacturing a continuous spring strip comprising alternate right and left handed coils from a continuous integral length of wire by feeding the continuous length of wire in a path as defined by a guide and engaging the wire from one side thereof to coil the wire in a clockwise direction relative to the guide and subsequently engaging the wire from the opposite side to coil the wire in a counterclockwise direction relative to the guide.

---

Spring assemblies of the type to which this invention pertains are utilized in cushions, mattresses, bed springs, and the like. Until recently, the use of coil springs in such assemblies have been limited to individual coils connected together by independent wires, or the like. United States Patent 3,188,845 discloses an apparatus for forming a single integral length of wire into a row of alternately left and right handed coils which are integrally connected together. Such a row of coils is combined with like rows to provide a usable spring assembly, such a spring assembly and its fabrication being described in copending application S. N. 636,750, filed May 8, 1967, in the name of John B. Simons and assigned to the assignee of the instant invention. In the above-mentioned patent, a continuous length of wire is fed through a hook-shaped wire guide and is directed against a cylindrical roller which engages one side of the wire to cause it to coil. The hook-shaped guide is pivoted so that the wire fed therefrom is formed into alternate right and left handed coils. The wire, however, is always coiled in the same circular path, i.e., clockwise or counterclockwise, relative to the guide since the guide pivots or rotates.

It is an object and feature of the instant invention to provide another and superior method and apparatus for manufacturing a row of alternately right and left handed coils from a continuous integral length of wire.

Another object and feature of this invention is to provide a novel method of manufacturing a continous spring strip comprising alternate right and left handed spiral coils from a continuous integral length of wire by ejecting the wire from a guide, coiling the wire in a clockwise path relative to the guide to form a spiral in one direction and thereafter coiling the wire in a counterclockwise path relative to the guide to form a spiral in the opposite direction, thereby eliminating the necessity to move the guide.

A further object and feature of this invention is to provide a method of manufacturing a continuous spring strip comprising alternate right and left handed coils from a continuous integral length of wire by feeding a continuous length of wire in a path and alternately engaging the wire from opposite sides thereof to form the wire into the alternate left and right handed coils.

Yet another object and feature of this invention is to provide an apparatus for forming a continuous spring strip comprising alternate right and left handed coils from a continuous integral length of wire and including means for moving the length of wire through a generally annular guide and coil forming means for alternately contacting one side of the wire as it emerges from the guide to bias and bend the wire in a direction toward one side of the guide and for thereafter contacting the wire on the other side thereof to bias and bend the wire toward the other side of the guide thereby coiling the wire in alternate clockwise and counterclockwise directions.

Other objects, features and attendant advantages of the present invention will be readily appreciated as the same becomes better understood by reference to the following detailed description when considered in connection with the accompanying drawings wherein.

Figure 1:
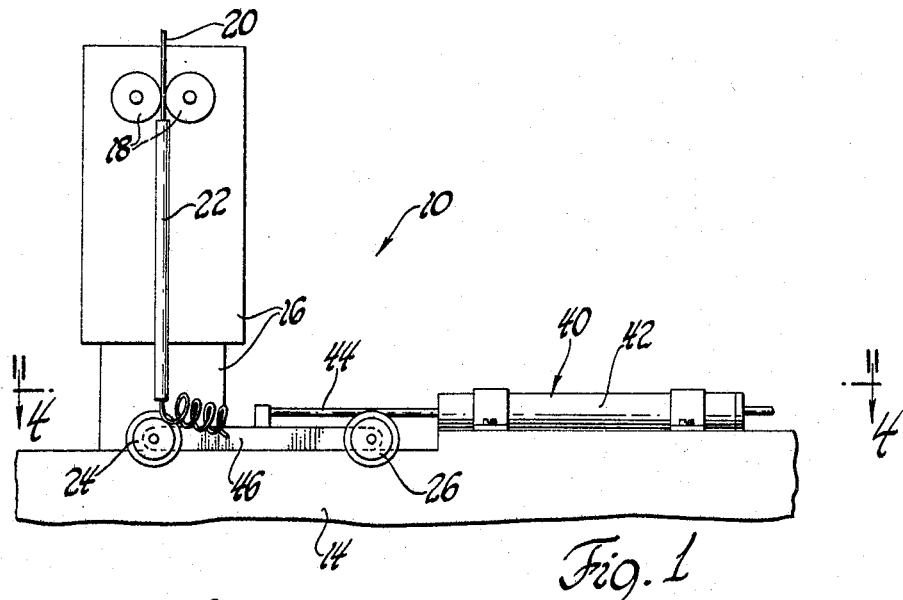
FIGURE 1 is an elevational view of a preferred embodiment of the instant invention.

Referring now to the drawings, wherein like numerals indicate like or corresponding parts throughout the several views, a preferred embodiment of the apparatus is generally indicated at 10. The apparatus forms a continuous spring strip comprising alternate right and left handed spiral coils 12 from a continuous integral length of wire.

The apparatus includes a support structure 14 and includes a pedestal 16 extending upwardly therefrom.

A feed means, which comprises the drive rollers 18, moves a continuous length of wire 20 in a substantially stationary path. The stationary path is defined by the guide means comprising the guide tube 22. The guide tube 22 is rigidly attached to the pedestal 16. The wire 20 is fed downwardly through the guide tube 22 by the drive rollers 18 and emerges from the generally annular lower end of the guide tube.

Figure 3:
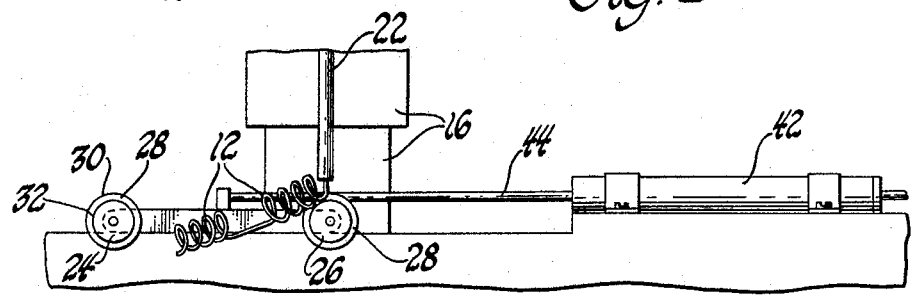
FIGURE 3 is an elevational view similar to FIGURE 1 but showing yet another moved position.

There is also included forming means for sequentially coiling the wire in a clockwise path relative to the guide tube 22 to form a spiral in one direction (as illustrated in FIGURE 1) and for coiling the wire in a counterclockwise path relative to the guide tube 22 to form a spiral in the opposite direction (as illustrated in FIGURE 3). The forming means comprises the froming roller 24 for sensitively engaging the wire 20 from one side thereof to bias and bend the wire toward one side of the end of the guide tube thereby forming the wire into a spiral coil in a clockwise direction as illustrated in FIGURE 1 and a second forming roller 26 selectively engageable with the wire 20 from the opposite side thereof to bias and bend the wire toward the other side of the end of the guide tube thereby forming the wire into a spiral coil in a counterclockwise direction as illustrated in FIGURE 3. The end of the guide tube 22 is preferably made of a hard durable material to prevent or reduce wear. The end of the guide tube may be rotatable or indexable to evenly wear the opening from which the wire is ejected and against which it is biased while being coiled.

Each of the rotatable rollers 24 and 26 includes a tapered bending surface for engaging and bending the wire into a spiral coil. More specifically, the bending surface is an arcuate circumferential surface 28 which extends about the rollers and between the diameters 30 and 32 which are of different dimensions, as illustrated by roller 24 in FIGURE 3. The forming rollers 24 and 26 are disposed on opposite sides of the wire as it emerges from the end of the guid tube, i.e., 180° from one another about the longitudinal axis of the wire 20.

Figure 2:
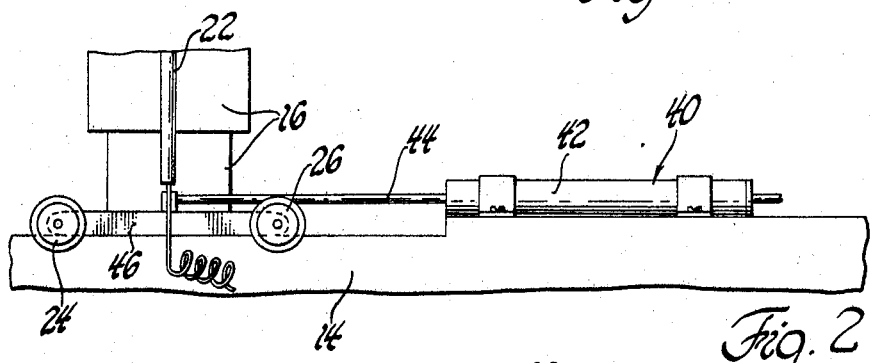
FIGURE 2 is an elevational view similar to FIGURE 1 but showing a moved position.
Figure 4:
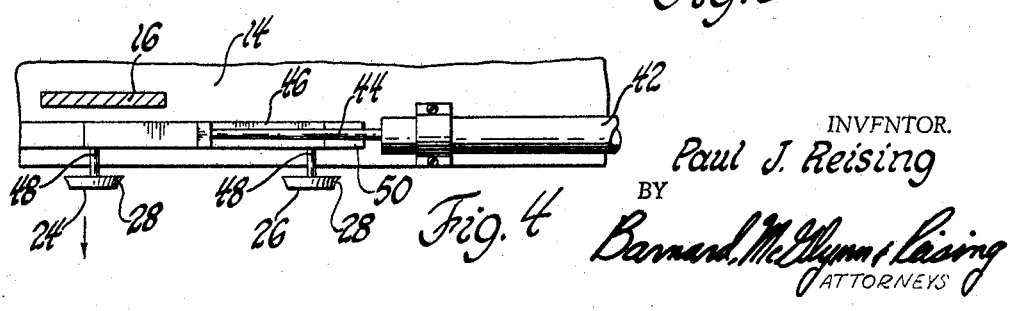
FIGURE 4 is a fragmentary view taken substantially along line 4—4 of FIGURE 1.

There is also included a control means, generally indicated at 40, for selectively and alternately moving the first and second forming rollers 24 and 26 into engagement with the wire 20 from opposite sides thereof. More specifically, the control means includes a hydraulic actuator 42 which moves a plunger 44. The plunger 44 is connected to a member 46 which in turn rotatably supports the forming rollers 24 and 26 through the spindles or shafts 48. The member 46 is slidably disposed in a recess 50 in the support structure 14 as best illustrated in FIGURE 4. Thus, the forming rollers 24 and 26 are operatively supported by the support structure through the member 46 for sliding movement relative to the support structure 14. When the plunger 44 is, for a predetermined period, in the retracted position illustrated in FIGURE 1, the roller 24 engages the wire 20 for forming the spiral coil in the direction illustrated in FIGURE 1. when the plunger is, for a predetermined period, in the position illustrated in FIGURE 2, or as it moves for a predetermined period from the FIGURE 1 position to the FIGURE 3 position, the wire 20 is fed in a continuous straight path without being coiled. As illustrated in FIGURE 3, the plunger is in the fully extended position so that during this predetermined period the forming roller 26 engages the wire to form a spiral coil in the opposite direction. After the spiral coil is formed as illustrated in FIGURE 3, the plunger is retracted so that the wire again feeds in a straight path as shown in FIGURE 2 followed by coiling as shown in FIGURE 1. Any well known sequencing means may be utilized to control the actuation of the plunger 44.

Hence, the method illustrated in the drawings includes the steps of feeding a continuous length of wire and engaging the wire 20 from one side thereof for a predetermined period for coiling the wire in a clockwise direction, disengaging the wore for a predetermined period to provide a straight wire portion and thereafter engaging the wire for a predetermined period from the opposite side to coil the wire in a clockwise direction. As the wire is being alternately coiled in clockwise and counterclockwise directions, it is being moved away from the point at which the coiling occurs in a constant direction which is substantially outwardly of the bending rollers 24 and 26, i.e., the direction of the arrow in FIGURE 4.

The method, therefore, also includes the step of disengaging the wire for a third predetermined period before each engagement thereof on one side and disengaging the wire for a fourth predetermined period before each engagement thereof on the opposite side so that the wire moves in a straight path to form a straight portion between adjacent spiral coils 12. In order that the length of straight wire between adjacent spiral coils 12 be equal, the third and fourth predetermined periods during which the wire is not engaged are maintained substantially equal. When the formed spiral coils are disposed in an assembly, adjacent spiral coils are substantially parallel to one another and the straight portions interconnect adjacent coils and form part of the assembly.

In the practice of the invention, the radius of curvature imparted to the coil at any given time will be determined by the configuration of the bending surface 32 on each roller and position of the bending roller with respect to the end of the guide tube where the wire is being bent. Referring to FIGURE 1, for example, if the roller 24 is moved closer to the end of the guide tube 22, and if the roller 24 is moved further to the right so that the axis of rotation of the roller is on the same side of the longitudinal axis of the guide tube as the side on which the coil is being formed, a sharper bend, i.e., a bend of lesser radius of curvature, is imparted to the coil. Likewise, in FIGURE 3, if the distance between the end of the guide tube and the roller 28 is decreased and if the roller is moved to the left so that its axis of rotation is moved to the left side of the longitudinal axis of the guide tube, a sharper bend will be imparted. It is within the purview of the invention to sequence the relative position of each roller with respect to the guide tube to vary the radius of curvature imparted to the wire as it is bent. For example, if it is desired to impart a sharp bend at the beginning and end of each coil, it is only necessary to sequence the position of the bending roller with respect to the guide tube such that it is closer to the guide tube or shifted relative to the longitudinal axis of the guide tube as aforesaid, or both, for a short predetermined period at the beginning and end of contact of the roller with the wire as each coil is formed. The shift of the position of the roller with respect to the longitudinal axis of the guide tube can be accomplished simply by the sequencing means which controls the movement of the member 46 by the hydraulic mechanism 40. The sequencing of the vertical position of the rollers with respect to the guide tube can be accomplished by a vertically movable guide tube which is periodically moved closer to the roller, or by providing means for vertical movement of the assembly of the member 46 and rollers 24 and 26, and periodically moving this assembly vertically upwardly to decrease the distance between the end of the guide tube and the roller in contact with the wire.

In the preferred embodiment shown, the rollers 24 and 26 function not only to coil the wire in a circular path but also impart the spiral shape to the coils, this by way of the tapered or generally frusto-conical shape of the rollers. The pitch, or in other words, the distance between adjacent convolutions, of each spiral coil will be determined by the taper of the rollers, i.e., the angle between the bending surface and the axis of rotation of the roller. If desired, right-cylindrical rollers can be used to coil the wire and an additional member included to contact the wire immediately as or after it is coiled to impart the desired pitch to form the coil into a spiral. For example, each cylindrical roller can have associated with it a member which contacts the wire immediately as it is coiled by the roller to bias and bend the wire in the direction shown by the arrow in FIGURE 4 to thereby impart the desired spiral shape.

Other modifications of the invention will be apparent. For example, instead of reciprocating the rollers 24 and 26 horizontally with respect to the guide tube 22, the rollers 24 and 26 can be maintained stationary and the guide tube 22 reciprocated horizontally with respect to the rollers. As another example, a single roller can be reciprocated generally vertically to first contact one side of the wire, and, after withdrawal during which a straight section of wire is formed, moved upwardly into contact with the other side of the wire. Alternatively, a single roller can be swiveled from one side of the wire to the other, there being no contact of the roller during the period of swivel movement from one side to the other such that during this period a straight wire section is formed.

The relative position between the bending rollers and the guide tube is preferably sequenced so as to provide a spring assembly of the type illustrated in the aforementioned patent and application wherein adjacent spiral coils are integrally connected by a substantially C-shaped portion having spaced legs joined to the respective spiral coils and joined together by a substantially straight portion. To make such a spring assembly, there is first contact of the rollers 24 to coil the wire as shown in FIGURE 1, followed by roller withdrawal to provide a straight wire portion, followed by contact of the roller 24 with the wire so as to form a right angle bend, followed by roller withdrawal to provide another straight portion, followed by contact to provide a second right angle bend, followed by roller withdrawal to provide another straight wire portion, followed by contact of roller 26 with the wire to provide a coil in the opposite direction as shown in FIGURE 3. The sequence is then repeated but with roller 26 forming the bends.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of manufacturing a continuous spring strip comprising alternate right and left handed spiral coils from a continuous integral length of wire, said method comprising; ejecting a continuous length of wire from a guide, coiling the wire in a clockwise path relative to the guide for a first predetermined period to form a spiral in one direction, and coiling the wire in a counterclockwise path relative to the guide for a second predetermined period to form a spiral in the opposite direction.

2. A method as set forth in claim 1 including engaging the wire from one side thereof for coiling the wire in the clockwise path and engaging the wire from the opposite side thereof for coiling the wire in the counterclockwise path.

3. A method as set forth in claim 2 including disengaging the wire for a third predetermined period before each engagement thereof on said one side and disengaging the wire for a fourth predetermined period before each engagement thereof on said opposite side.

4. A method as set forth in claim 3 including maintaining said guide stationary.

5. A method as set forth in claim 3 including maintaining said third predetermined period equal to said fourth predetermined period.

6. A method as set forth in claim 5 including engaging the wire from said one side with a first forming member and engaging the wire from said opposite side thereof with a second forming member.

7. A method of manufacturing continuous spring strip comprising alternate right and left handed spiral coils from a continuous integral length of wire, said method comprising; ejecting a continuous length of wire from a guide, engaging one side of the wire as it emerges from the guide to bias and bend the wire toward one side of the guide thereby to coil the wire in a clockwise direction and thereafter engaging the other side of the wire as it emerges from the guide to bias and bend the wire toward the other side of the guide thereby to coil the wire in a counterclockwise direction.

8. An apparatus for forming a continuous spring strip comprising alternate right and left handed spiral coils from a continuous integral length of wire, said apparatus comprising; feed means for moving a length of wire, guide means for establishing a path of movement for said wire, and forming means for coiling the wire in a clockwise direction relative to said guide means to form a spiral in one direction and for coiling the wire in a counterclockwise direction relative to said guide means to form a spiral in the opposite direction.

9. An apparatus as set forth in claim 8 including control means for selectively moving said forming means into alternate engagement with opposite sides of said wire.

10. An apparatus as set forth in claim 9 wherein said forming means includes first and second independent bending surfaces for engaging and bending the wire into a spiral coil.

11. An apparatus as set forth in claim 10 wherein said first bending surface is disposed 180° about the longitudinal axis of the wire from said second bending surface.

12. An apparatus as set forth in claim 10 wherein said guide means includes an opening from which said wire is ejected.

13. An apparatus as set forth in claim 12 wherein said feed means includes a pair of drive rollers for engaging and moving the wire.

14. An apparatus as set forth in claim 13 wherein each of said bending surfaces is defined by a forming roller with an arcuate circumferential surface extending thereabout and between diameters of different dimensions on said roller.

15. An apparatus as set forth in claim 11 including a support structure, said first and second bending surfaces being operatively supported by said support structure for sliding movement relative thereto.

References Cited

UNITED STATES PATENTS

| | | | |
|---|---|---|---|
| 642,339 | 1/1900 | Krummel | 72—140 |
| 2,006,389 | 7/1935 | Fuchs | 72—140 |
| 3,188,845 | 6/1965 | Gerstorfer | 72—138 |

MILTON S. MEHR, Primary Examiner